United States Patent [19]

Agarwal et al.

[11] Patent Number: 4,653,815
[45] Date of Patent: Mar. 31, 1987

[54] ACTUATING MECHANISM IN A VEHICLE WHEEL BRAKE AND ANTI-LOCK BRAKE CONTROL SYSTEM

[75] Inventors: Paul D. Agarwal, Troy; Robert J. Hammersmith, Rochester; Alexander Kade, Grosse Pointe Woods, all of Mich.

[73] Assignee: General Motors Corporation, Detroit, Mich.

[21] Appl. No.: 789,870

[22] Filed: Oct. 21, 1985

[51] Int. Cl.[4] .................................................. B60T 8/42
[52] U.S. Cl. ...................................... 303/100; 303/113; 303/115; 303/DIG. 4
[58] Field of Search ............... 188/181 A, 161, 181 R, 188/162, 181 C; 303/3, 15, 20, 100, 113, 115, 119, DIG. 3, DIG. 4

[56] References Cited

U.S. PATENT DOCUMENTS

| | | | |
|---|---|---|---|
| 2,845,147 | 7/1958 | Hill | 188/181 A |
| 3,549,210 | 12/1970 | Birge et al. | 303/115 |
| 3,698,772 | 10/1972 | Nixon | 188/181 A |
| 3,790,225 | 2/1974 | Wehde | 303/113 |
| 3,802,745 | 4/1974 | Strifler et al. | 303/113 |
| 3,827,758 | 8/1974 | Hansen | 303/3 |
| 3,887,238 | 3/1974 | Bennett | 303/7 |
| 3,963,277 | 6/1976 | Chiba | 303/113 |
| 4,381,049 | 4/1983 | Crossman | 188/161 |
| 4,398,389 | 8/1983 | Horvath | 60/545 |

Primary Examiner—John W. Caldwell, Sr.
Assistant Examiner—Alvin Oberley
Attorney, Agent, or Firm—D. D. McGraw

[57] ABSTRACT

A vehicle brake and wheel anti-lock control system in which an electronically controlled actuator normally provides brake pressure for the vehicle wheel brakes and also acts as a modulator to vary the brake actuating pressures for wheel anti-lock control. The actuator is so arranged that a master cylinder may be used to provide actuating pressure to the wheel brakes, the pressure passing through the actuator pressurizing chamber, if for any reason the actuator does not perform as needed to provide brake actuating pressure to stop the vehicle.

1 Claim, 4 Drawing Figures

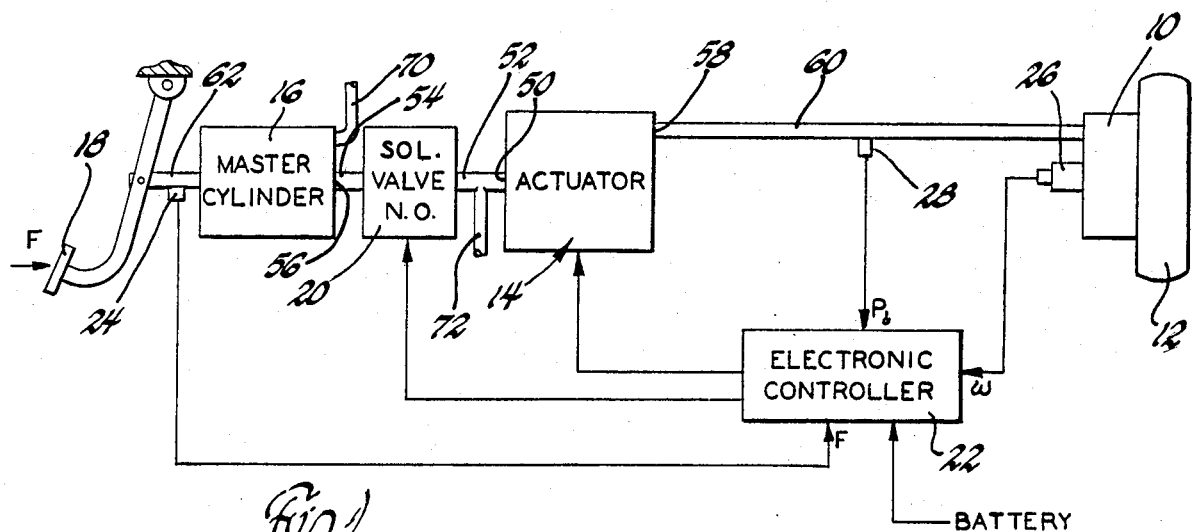
*Fig. 1*
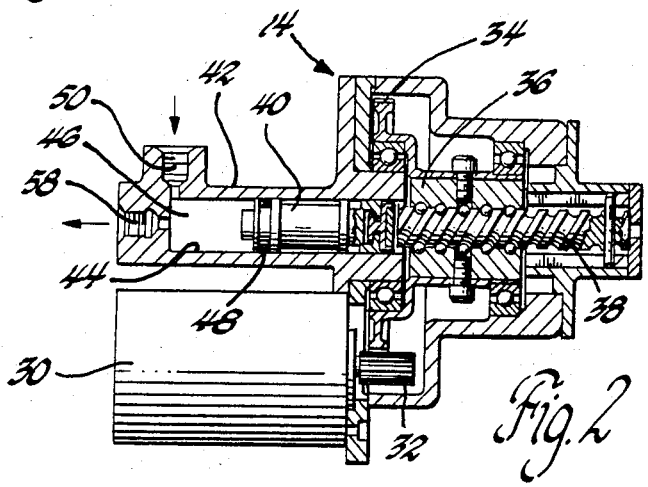
*Fig. 2*
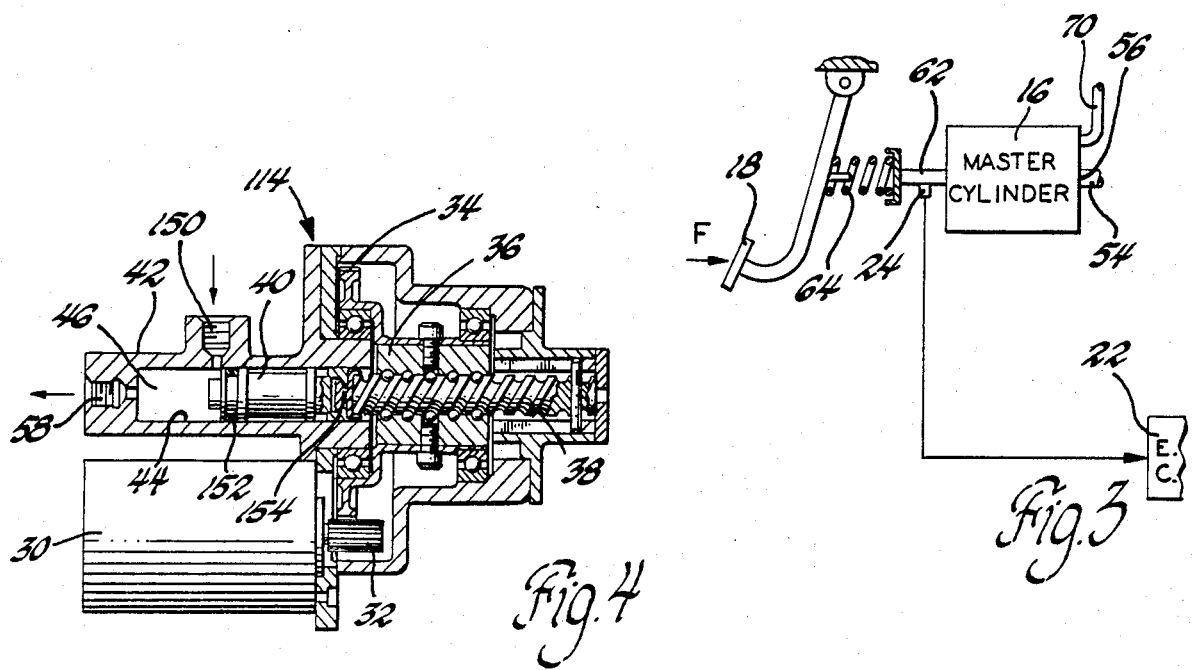
*Fig. 4*
*Fig. 3*

ACTUATING MECHANISM IN A VEHICLE WHEEL BRAKE AND ANTI-LOCK BRAKE CONTROL SYSTEM

BACKGROUND OF THE INVENTION

This invention relates to a vehicle wheel brake and wheel anti-lock control system for vehicle wheel brakes and more particularly to the brake pressure control means therein, including an actuator.

When the brakes of a vehicle are applied, a braking force between the wheel and the road surface is generated that is dependent upon various parameters including the road surface condition and the amount of slip between the wheel and the road surface. For a given road surface, the force between the wheel and the road surface increases with increasing slip values to a peak force occurring at a critical wheel slip value. As the value of wheel slip increases beyond the critical slip value, the force between the wheel and the road surface decreases. Stable braking results when the slip value is equal to or less than the critical slip value. However, when the slip value becomes greater than the critical slip value, braking becomes unstable resulting in sudden wheel lockup, reduced vehicle stopping distance and a deterioration in the lateral stability of the vehicle.

Numerous wheel lock control systems have been proposed to prevent the wheels from locking up while being braked. Typically, these systems prevent the wheels from locking by releasing the applied brake pressure when an incipient wheel lockup condition is sensed. One criterion that is used to sense an incipient wheel lockup condition is excessive wheel deceleration. After release of the brake pressure, the wheel deceleration ceases and the wheels then accelerate toward vehicle speed. When the wheel speed has substantially recovered, brake pressure is reapplied. One criterion that is typically used to sense recovery is wheel acceleration falling below a specified low value. Reapplication of brake pressure results in the wheel again approaching lockup and the cycle is repeated. This form of wheel lock control system results in a rapid cycling of the brake pressure and the wheel slip value around the critical slip value to prevent wheel lockup. Ten Hertz is a typical cycling frequency. Brake pressure modulators of various types have been used to cycle and limit the brake pressure at the vehicle wheel brakes to accomplish this.

SUMMARY OF THE INVENTION

As opposed to the foregoing systems for preventing wheel lockup during braking, the subject invention is directed toward improvements used in a system which identifies the wheel brake pressure that results in the wheel slip being at the critical slip value and which produces the maximum braking force between the tire and the road surface. The brake pressure so identified is then applied to the wheel brake by using wheel brake pressure control means including an actuator and embodying the invention claimed herein so as to substantially continuously establish the critical slip value between the wheel and the road surface resulting in the maximum possible braking effort.

In general, the system in which the subject invention is employed repeatedly calculates the braking force between the wheel and the road surface during braking from system constants and measured values and stores the brake pressure corresponding in time to the peak calculated force. When an incipient wheel lockup is detected indicating that the critical wheel slip value and therefore the peak braking force between the wheel and road surface has been exceeded, the stored brake pressure that produced the peak braking force is reestablished to establish a braking condition in which the wheel slip is substantially at the critical slip value for the existing road-tire interface condition. The braking pressure reestablished to produce the critical wheel slip value is automatically adjusted to compensate for changing brake system parameters and for other errors that may exist in the calculation of the braking force to provide for a system that self-adapts to those changes and errors.

The wheel brake pressure control means to which the invention claimed herein is directed is placed in a brake line controlled by an electronic controller. It is also controlled by actuation of the brake pedal in its control of the master cylinder. It includes a normally open solenoid-operated valve in the brake line near the outlet of the master cylinder to which the brake line is connected. It also includes a pressure sensor in the brake line which senses the wheel brake actuating pressure delivered to the wheel brake and generates signals corresponding to the sensed pressure, those signals being sent to the electronic controller for use by the system. It particularly includes a wheel brake pressure control actuator which is positioned in the brake line intermediate the normally open solenoid-operated valve and the brake actuating pressure sensor. The actuator includes a brake fluid pressurizing section having a cylinder forming a pressure chamber, with a piston similar to a master cylinder piston reciprocably moveable in the cylinder to increase and decrease the displacement volume of the pressure chamber and therefore generate brake actuating pressures therein when the actuator is actuated. The brake line from the normally open valve is connected to an inlet to the cylinder, and the brake line which is connected to the wheel brake is connected to an outlet connected to the chamber of the cylinder. The actuator includes a reversible motor and motor-driven actuating mechanism which is operatively connected to the piston. The motor-driven actuating mechanism will drive the piston in one direction to decrease the displacement of the chamber and therefore increase wheel brake actuating pressure delivered to the wheel brake when it is appropriately driven by the motor. The actuating mechanism will move in the opposite direction to permit an increase in the displacement of the chamber to decrease the wheel brake actuating pressure independently of any pressure being generated in the master cylinder. In some instances the actuating mechanism is so connected to the piston as to positively move the piston in the direction to increase the chamber displacement. When the actuator is energized under control of the electronic controller, the normally open valve is also closed so that no pressure generated in the master cylinder is then delivered through the brake line to the wheel brake. The actuator will generate and vary the brake actuating pressures to actuate the wheel brake in accordance with braking demand and wheel anti-lock control signals generated by the controller so as to control the braking action of the wheel brake. Brake demand is sensed by a sensor responding to actuation of the brake pedal by the vehicle operator.

Since during operation of the brake pedal and the actuator the master cylinder outlet is closed by the solenoid operated valve, the master cylinder will merely increase the static pressure therein but cannot transmit that pressure to the actuator or the brake line and thence to the wheel brake. Therefore in some instances it is desirable to provide a resilient member such as a compression spring which is positioned mechanically between the brake pedal and the input member of the master cylinder and is so calibrated that the arrangement will provide sensorily acceptable brake pedal stroke and pedal feel to the vehicle operator.

The actuator also preferably has a check valve therein which may be formed by a V-block seal on the the piston, all being reciprocably moveable in the cylinder. This will permit brake pressure generated by the master cylinder to enter the actuator chamber and be delivered to the wheel brake for brake actuation independently of the motor and motor driven actuating mechanism when the normally open solenoid-operated valve remains open even through the electronic controller or other parameters indicate that the actuator should be actuated so as to control the brake pressure independently of the master cylinder. This could occur, for example, when certain signals are not appropriately received or generated, or the electric motor which drives the mechanism is not functioning properly. This permits the vehicle operator to stop the vehicle under such operational circumstances. In normal operation, the actuator provides routine service braking pressures as well as wheel anti-lock control of the braking pressures.

DESCRIPTION OF THE DRAWINGS

The invention may be best understood by reference to the following description of a preferred embodiment and the drawings in which:

FIG. 1 is a general schematic diagram of the braking system for controlling the brakes in accord with the principles of this invention;

FIG. 2 is a cross-section diagram of the actuator of FIG. 1 for modulating or varying the brake pressure to prevent wheel lockup;

FIG. 3 is a schematic diagram showing a modification of the system shown in FIG. 1;

FIG. 4 shows a modification of the actuator of FIG. 2.

DESCRIPTION OF THE PREFERRED EMBODIMENT

A wheel under the influence of braking has two major torques acting on it: brake torque and tire torque. Brake torque arises from the application of brake pressure through the brake mechanism and tire torque is generated by the friction of the tire-road interface as wheel slip occurs.

Brake torque $T_b$ is assumed to be proportional to brake pressure $P_b$ with a known brake gain $K_b$ and is defined by the expression $$T_b = P_b K_b. \qquad (1)$$

Tire torque $T_t$ is related to the brake force coefficient $\mu$ between the tire and the road surface, the normal load N on the tire and the wheel rolling radius R and is defined by the expression $$T_t = \mu N R. \qquad (2)$$

For the free body consisting of the brake, wheel, and tire, the equation of motion is $$I_w \dot{\omega} + T_b - T_t = 0 \qquad (3)$$

where $I_w$ is the wheel moment of inertia and $\dot{\omega}$ is the wheel angular acceleration. When the difference between the tire torque and the brake torque is positive, the wheel accelerates; and when negative, the wheel decelerates.

Rearranging expression 3, tire torque $T_t$ is defined as $$T_t = I_w \dot{\omega} + T_b. \qquad (4)$$

As can be seen, the tire torque can be calculated from values that are either known or can be measured. The wheel moment of inertia $I_w$ and the brake gain $K_b$ are known values, the value of brake pressure $P_b$ can be measured, and $\omega$ can be determined by differentiating the value of wheel speed which can be measured.

The brake friction coefficient term $\mu$ of the tire torque $T_t$ is a nonlinear function of the magnitude of slip between the wheel and the road surface during braking and is dependent upon the road surface condition. As more particularly disclosed in application Ser. No. 789,576 filed on Oct. 21, 1985 and claiming the system shown in FIG. 1, and the logic and circuitry used therein, the brake friction coefficient $\mu$ as a function of percentage-wheel slip for two road surface conditions. For a given road surface, it can be seen that as wheel slip is increased in response to increased brake torque $T_b$, the brake friction coefficient $\mu$ and therefore the tire torque $T_t$ increases until a critical slip value at which the brake friction coefficient and the tire torque are at a maximum. A further increase in wheel slip results in a decrease in the brake friction coefficient and tire torque. The maximum tire torque resulting in a maximum braking effort for a given road surface is achieved when the brake torque $T_b$ produces the critical wheel slip value. When the braking effort produces a wheel slip exceeding the critical slip value, the braking operation becomes unstable and typically results in sudden wheel lockup which in turn results in increased stopping distance and a deterioration in the steering and lateral stability of the vehicle.

In general, the brake control system incorporating the principles of the invention claimed in the above noted application Ser. No. 789,576 identifies the value of the braking pressure $P_b$ that produces the maximum tire torque $T_t$. This is accomplished by continuously calculating the tire torque value $T_t$ of equation (4) during braking. Any time the calculated value is larger than any previously calculated value, the value of the braking pressure $P_b$ is stored so that the brake pressure producing the maximum tire torque is known. When an incipient wheel lock is detected, the brake pressure is dumped to allow the wheel speed to recover and the brake pressure is thereafter reapplied to the stored value to establish a braking condition in which the wheel slip is substantially at the critical slip value for the existing road surface condition. This results in substantially the maximum possible tire torque $T_t$ and minimum stopping distance for the road surface condition.

If for some reason, such as a change occurs in the brake system parameters over time, there exists an error in the calculated tire torque which results in the storing and subsequent reapplication of an unstable brake pressure, the brake pressure is adaptively reduced until a stable pressure is identified that produces substantially the critical slip value and therefore the maximum braking effort. This is accomplished by establishing the reapplied brake pressure at a predetermined fraction of the stored brake pressure $P_b$ that corresponded in time to the maximum calculated value of tire torque $T_t$. If the resulting applied brake pressure results in a sensed incipient wheel lockup condition, the brake pressure next applied is again reduced by the fraction. The repeated reduction of the applied brake pressure by this predetermined fraction, such as 0.9, provides for self-adaptation to changing brake system parameters including changes in the coefficient of friction of the brake linings or for any errors in the coefficients utilized in the calculation of tire torque.

A general overview of the wheel lock control system in which the invention claimed herein is used is illustrated in FIG. 1. The control of the brake of a single wheel is illustrated, it being understood that the control of the brakes of the remaining wheels of the vehicle are identical thereto. A standard wheel brake 10 for a wheel 12 is actuated by controlled hydraulic pressure from one of two sources. The primary source is a motor driven actuator 14 and the secondary source is a standard master cylinder 16 controlled directly by the vehicle brake pedal 18. A normally open electromagnetic (solenoid-operated) valve 20 is energized when the actuator 14 is operative to control the hydraulic pressure to the brake 10 so as to decouple the master cylinder 16 and brake pedal 18 from the hydraulic pressure output of the actuator 14. This prevents pressure feedback to the vehicle operator while brake pressure is controlled by the actuator 14. When the electromagnetic valve 20 is deenergized, the hydraulic pressure to brake 10 may be modulated directly by the brake pedal 18 and master cylinder 16.

The valve 20 is deenergized only during limited vehicle operating conditions, such as low vehicle speed or during failed conditions of the primary hydraulic pressure source, to permit brake pressure modulation by the master cylinder 16. At all other times, the valve 20 is energized to decouple the master cylinder 16 from the braking system.

An electronic controller 22 is responsive to the outputs of a brake pedal force sensor 24 providing a signal that is a measure of the operator applied brake pedal force F, a wheel speed sensor 26 that provides a signal to controller 22 that is a measure of wheel speed $\omega$, and a pressure sensor 28 that provides a signal to controller 22 that is a measure of the hydraulic brake actuating pressure $P_b$ applied to the brake 10 from the master cylinder 16 or the actuator 14. The electronic controller 22 is responsive to those signals to (a) energize the valve 20 when the wheel speed $\omega$ exceeds a value corresponding to a low vehicle speed such as 3 mph, (b) control the actuator 14 so as to apply a hydraulic pressure $P_b$ to the brake 10 that is proportional to the brake force F times a gain constant G for providing power assist during normal braking conditions, and (c) limit the pressure $P_b$ applied to the brake 10 to a value that results in the maximum possible tire torque $T_t$ for the road surface condition to prevent wheel lockup and to provide for the shortest possible stopping distance, lateral vehicle stability and controllable vehicle steering.

Referring to FIG. 2, the actuator 14 in the preferred embodiment includes a DC torque motor 30 whose output shaft drives an input gear 32 which in turn rotatably drives an output gear 34. The drive member 36 of a ball screw actuator is secured for rotation with the output gear 34. The drive member 36 engages and axially positions the driven member 38 of the ball screw actuator. The driven member 38 drives a piston 40 to control the hydraulic pressure output of the actuator 14. In summary, the torque output of the motor 30 is translated to a directly related hydraulic pressure $P_b$ output of the actuator 14 that is applied to the brake 10.

The electronic controller 22 is more completely described and illustrated in the above noted application Ser. No. 789,576, that application is hereby incorporated herein by reference.

As is more particularly illustrated in FIG. 2, the actuator 14 includes a housing 42 in which a cylinder 44 is formed. The piston 40 is reciprocably received in cylinder 44 and defined therewith a chamber 46. Piston 40 has a suitable seal 48 thereon which permits movement of the piston in the leftward direction as seen in FIG. 2 to decrease the displacement of chamber 46 and therefore increase the fluid pressure therein. The cylinder 44 has an inlet 50 which is connected to the portion 52 of the brake line which operatively connects the master cylinder 16 and the wheel brake 10. Another portion 54 of the brake line connects the outlet 56 of the master cylinder to the valve 20. The brake line portion 52 connects the outlet of the valve 20 to the actuator inlet 50. The actuator has an outlet 58 from chamber 46 which is connected by brake line portion 60 to the wheel brake 10. It can be seen that when valve 20 is open and the master cylinder 16 is actuated, brake pressure generated in the master cylinder may be delivered through the brake line portions, valve 20 and actuator chamber 46 to the wheel brake 10. However, when valve 20 is closed by energization of the solenoid operating that valve, under control of the electronic controller 22, depression of the brake pedal 18 will generate pressure in the master cylinder but that pressure cannot be delivered to the brake line portion 52 and therebeyond. Likewise, any pressure generated in the actuator chamber 46 by appropriate movement of piston 40 cannot be delivered through the closed valve 20 to the master cylinder. Therefore the modulating or varying action of the actuator during wheel anti-lock control conditions will not be transmitted to the brake pedal 18 and will not be felt by the vehicle operator.

The motor 30 is a reversible motor so that when it rotates in one direction under control of controller 22, it drives the gear 34, which acts through the drive member 36 to drive the driven member 38 against the rear end of the piston 40 to drive the piston leftwardly as seen in FIG. 2 to generate brake pressure in chamber 46. When the motor 30 is stopped, the brake pressure in chamber 46, and therefore in the wheel brake 10, will simply be maintained at a particular pressure level. When motor 30 is caused to move in the opposite direction, it will rotate drive gear 34 in the opposite direction and therefore drive member 36 will be oppositely rotated. This will cause the driven member 38 to move axially in the reverse direction, so that it no longer supports piston 40 in its actuated position. The pressure in chamber 46 will therefore urge piston 40 rightwardly as seen in FIG. 2, increasing the displacement in chamber 46 and therefore decreasing the pressure in that chamber and the brake actuating pressure delivered to wheel brake 10.

In the particular arrangement shown in FIG. 1, the brake pedal 18 normally moves very little, generating a brake pressure within the master cylinder which corresponds to the force F being exerted on the brake pedal. It is only when other portions of the system are inoperative so that valve 20 remains open that the brake pedal 18 moves through a stroke distance to pressurize and displace fluid from the master cylinder and deliver that fluid through the brake line as above discussed to directly actuate the wheel brake 10.

In some instances it is preferred to allow the brake pedal to move in a stroke at all times so as to provide a sensorily acceptable pedal stroke and pedal feel to the pedal operator. The modification illustrated in FIG. 3 provides this arrangement. Only the modified portion of the diagram of FIG. 1 is illustrated. In this instance, the brake pedal 18 is connected to the input member 62 of the master cylinder through a resilient member 64, which may be a compression spring or other suitable resilient member. The resilient member is calibrated so as to provide the sensorily acceptable pedal stroke and pedal feel to the brake operator by resisting the actuating movement of the brake pedal as if the master cylinder were being normally operated, even though in fact the valve 20 is closed and does not permit it to displace any brake fluid.

FIG. 4 illustrates a modification 114 of the actuator 14 of FIG. 2. In this Figure the inlet 150 is positioned so that the V-block seal 152 on piston 40 axially clears the inlet 150 when the piston is positioned in the fully released position illustrated. Therefore the inlet is open into the chamber 46 immediately adjacent the V-block seal which also acts as a check valve. The seal 152 will close off the inlet 150 from chamber 46 when the piston 40 is moved in the chamber in the displacement-decreasing direction, thereby preventing brake fluid from flowing from the chamber 46 to the chamber inlet 150 and the brake line portion 54 during actuation of the actuator. However, it is noted that the V-block seal, functioning as a check valve, will permit fluid flow from the inlet 150 to the chamber 46 between the chamber wall and the outer periphery of the seal 152 when a higher fluid pressure exists at the inlet 150 than exists in the chamber 46. Such a higher fluid pressure will so exist only when the master cylinder is actuated and valve 20 is, for some reason, open so as to deliver a higher brake fluid pressure to the brake line. If, for example, controller 22 does not control valve 20 so as to close that valve, the brake master cylinder can be used to actuate the vehicle wheel brake 10 to stop the vehicle.

It is also noted that the arrangement in FIG. 4 has the driven member 38 connected at 154 to the piston 40 so that axial movements in both directions of the driven member 38 are positively delivered to the piston 40. Therefore the piston 40 will not only be positively moved in the decreasing-displacement direction, but will also be positively moved in the increasing-displacement direction. Therefore when the driven member 38 is moved axially so as to cause a decrease in pressure in chamber 46 and brake line portion 60, piston 40 is positively moved in the direction to cause such a result. This may have some advantage in certain types of actuators. If there is a fairly high mechanical drag between the piston and the wall of the cylinder 44, for example, the power of motor 30 will easily overcome such resistance.

An actuating mechanism has been disclosed which will normally operate to control the brake actuating pressure for the wheel brake. It is preferred that the valve 20 and the actuator 14 be in a brake line for a particular wheel brake 10 so that each wheel brake is independently controlled. Alternatively, the valve 20 may control an axle set of brakes, with a separate actuator 14 for each wheel brake. Thus, in FIG. 1, the branch brake line 70 from master cylinder 16 may be connected to one or more other valves 20, actuators 14 and wheel brakes 10. The branch brake line 72 may be connected to another actuator 14 and wheel brake 10. In some instances, it may be desirable to use one valve 20 and actuator 14 for an axle set of wheel brakes, for example the rear wheels of a vehicle or the front wheels of a vehicle. Other well known split circuit arrangements may also be used.

The embodiments of the invention in which an exclusive property or privilege is claimed are defined as follows:

1. In a vehicle wheel braking and wheel anti-lock control system having a brake pedal, a master cylinder actuatable by the brake pedal, at least one wheel brake for braking a wheel when the brake pedal is urged in the brake actuating direction, the wheel brake operatively receiving brake actuating fluid through a brake line under pressure during braking, the brake line operatively connecting the outlet of the master cylinder with the wheel brake, wheel brake control means including an electronic controller and a sensor sensing a rotating condition of the wheel and delivering a signal responsive to same to the controller, and wheel brake pressure control means in the brake line controlled by the controller and the actuation of the brake pedal to control the master cylinder, the improvement comprising:

said wheel brake pressure control means including a normally open solenoid-operated valve in the brake line near the outlet of the master cylinder to which the brake line is connected, a pressure sensor in the brake line sensing the wheel brake actuating pressure delivered to the wheel brake and sending a signal to the controller responsive to that sensed pressure, and a wheel brake pressure control actuator in the brake line intermediate said valve and said pressure sensor, said actuator including a brake fluid pressurizing section having a cylinder. a pressure chamber in said cylinder, a piston reciprocably movable in said cylinder to increase and decrease the displacement volume of said pressure chamber and generate pressures therein, an inlet to which the brake line is connected from said normally open valve, an outlet to which the brake line is connected to the wheel brake, and a reversible motor and motor-driven actuating mechanism in operative connection with said piston to drive said piston in one direction to decrease the displacement of said chamber and increase the wheel brake actuating pressure to said wheel brake and to move in the opposite direction to at least permit an increase in the displacement of said chamber to decrease the wheel brake actuating pressure to said wheel brake independently of any pressure being generated in the master cylinder, said reversible motor and motor-driven actuating mecahanism and said noramlly open valve normally being controlled by the controller when the brake pedal is urged in the actuating direction to close said normally open valve and activate said motor to drive said actuator to generate brake actuating pressure therein to actuate the wheel brake in accordance with braking demand and any wheel anti-lock control signals generated by the controller to control the braking action of the wheel brake during normal braking operation and during wheel anti-lock control conditions, said actuator having therein a check valve permitting brake pressure generated by the master cylinder to enter said chamber and be delivered to said wheel brake for brake actuation independently of said motor and motor-driven actuating mechanism when said normally open valve remains open for any reason during brake actuating movement of the brake pedal causing actuation of the master cylinder to displace brake fluid therefrom under pressure, thus providing a secondary brake actuating pressure source from the master cylinder and delivery of brake actuating pressure to said wheel brake which does not depend upon actuation of said motor and motor-driven actuating mechanism to actuate said wheel brake;

said check valve being a V-block seal on said piston normally sealing engaging the wall of said chamber and which when said piston is positioned in the fully released position in said chamber axially clears said inlet to open said inlet into siad chamber immediately adjacent said check valve, and to close off said inlet from said chamber when said piston is moved in the chamber displacement-decreasing direction to prevent brake fluid from flowing from said chamber to said chamber inlet during actuation of said actuator, said V-block seal and check valve permitting fluid flow from said inlet to said chamber between the chamber wall and said V-block seal and check valve when a higher fluid pressure exists at said inlet than in said chamber, said herer fluid pressure only being possible when said master cylinder is actuated so as to deliver brake fluid pressure to the brake line and at the same time said normally open valve in the brake line is open.

* * * * *